United States Patent [19]
Waldron

[11] Patent Number: 6,055,816
[45] Date of Patent: *May 2, 2000

[54] CLEAN ROOM ATMOSPHERE CONTROL

[75] Inventor: Stephen Norman Waldron, Lingfield, United Kingdom

[73] Assignee: The BOC Group plc, Windlesham, United Kingdom

[*] Notice: This patent is subject to a terminal disclaimer.

[21] Appl. No.: 09/095,172

[22] Filed: Jun. 10, 1998

[30] Foreign Application Priority Data

Jun. 12, 1997 [GB] United Kingdom ................... 9712198

[51] Int. Cl.[7] .............................. F17C 9/02; F24F 3/16
[52] U.S. Cl. ................................ 62/50.2; 62/78
[58] Field of Search .................... 62/50.1, 50.2, 62/78, 908

[56] References Cited

U.S. PATENT DOCUMENTS

| | | | |
|---|---|---|---|
| 2,650,481 | 9/1953 | Cooper | 62/908 |
| 2,873,582 | 2/1959 | Green | 62/50.2 |
| 2,943,459 | 7/1960 | Rind | 62/50.2 |
| 4,337,071 | 6/1982 | Yang | 62/908 |
| 5,749,232 | 5/1998 | Sauer | 62/50.1 |
| 5,775,110 | 7/1998 | Waldron | 62/50.2 |
| 5,778,687 | 7/1998 | Waldron | 62/78 |
| 5,913,893 | 6/1999 | Gary et al. | 62/636 |

*Primary Examiner*—William Doerrler
*Attorney, Agent, or Firm*—Salvatore P. Pace

[57] ABSTRACT

A method and apparatus for providing a clean respirable atmosphere in a clean room. A liquefied breathable gas is supplied from a source thereof and filtered. The filtered liquid is vaporised and the gas produced by the vaporisation is filtered. Thereafter the filtered gas is introduced into the clean room.

6 Claims, 1 Drawing Sheet

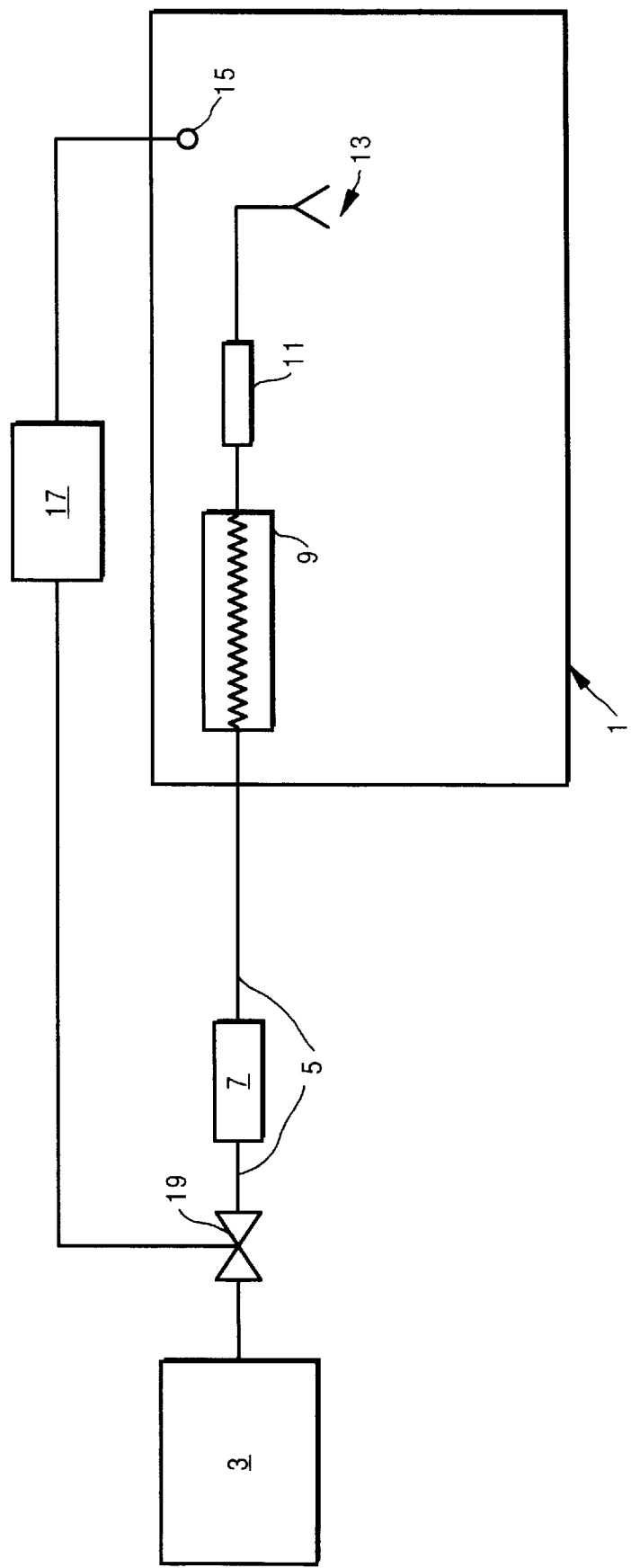

CLEAN ROOM ATMOSPHERE CONTROL

This invention relates to methods and apparatus for providing a clean, respirable atmosphere in a clean room.

Clean rooms are used extensively in the production of semiconductor devices, where it is essential to have an ultra clean environment. It is usual to classify the clean room atmosphere requirement according to a US Federal Standard, which classifies the cleanliness of the atmosphere required according to the number of particles entrained therein: for example, "Class 100" signifies that the clean room atmosphere contains less than 100 particles per cubic food (per 0.028 cubic meters) of size greater than 0.5 microns.

In conventional clean rooms, it is normal to have a Class 100 atmospheric cleanliness requirement; this is achieved by filtering and recirculating the air in the clean room using a large air filtration and conditioning unit. In a clean room where highly sensitive processes are carried out which necessitate a Class 1 level of atmospheric cleanliness, and/or in clean rooms in which it is necessary for a very large volume ol air to be processed, extremely sophisticated and expensive air handling systems are required to filter and condition the air.

Conventional clean room air handling systems are also incapable of rapidly accommodating changes in the rate of particle production within the clean room, such as when the number of human operators within the clean room changes, or when particular manufacturing processes are carried out. Moreover, the recirculation of air back to the clean room after filtration is inefficient; not only must particulates produced by people and machines within the clean room have to be removed, which places a greater load on the filtration system, but also the air handling system has to be sufficiently sophisticated to prevent the possibly harmful recirculation of gaseous pollutants, such as phosphine and arsine which might leak from machines commonly used in semiconductor wafer manufacture.

SUMMARY OF THE INVENTION

It is an object of the present invention to ameliorate and, to some extent, eliminate the above problems.

Accordingly, the present invention provides a method of providing a clean respirable atmosphere in a clean room comprising supplying a liquefied breathable gas from a source thereof, filtering the liquid, vaporising the filtered liquid, filtering the gas and introducing the filtered gas into the clean room.

Such an arrangement takes advantage of the fact that liquids are inherently easier to filter than gases. Consequently, it is possible to filter out at least the coarser particles from the liquid as it leaves the source, or storage vessel. The filtered liquid can then be piped close to the point of use before starting a heat exchange process, allowing the liquid to vaporised and expand in volume. The resulting gas can then be filtered to remove any remaining particles and thus leave an ultra-clean gas for introduction into the clean room.

Preferably the filtered gas is introduced in to the clean room at a rate sufficient to maintain an overpressure therein.

This overpressure need only be slightly greater than ambient atmospheric pressure within the clean room, in order to prevent the ingress of "dirty" air into the room. The air within the clean room may be vented to atmosphere, in which case the overpressure within the clean room creates a constant flow of clean air out of the clean room. This flow can be used advantageously to carry out from the clean room any particles generated by people and/or machines within the clean room and any harmful gaseous leakages from machines will be removed from the clean room.

The vents from the clean room to the atmosphere outside are preferably located adjacent any actual or potential sources of particulate or gaseous air pollutants in the clean room, such as adjacent human work stations or particular machines. The filtered gas may also be introduced into the clean room adjacent any such sources of pollutants, so as to create a localised overpressure and a localised flow of breathable gas which is effective to carry the pollutants away from the locality and out of the clean room.

Such "blanketing" of a source of pollutants is effective in preventing contamination of the clean room atmosphere and degradation of the manufacturing processes therein. The breathable gas is, of course, substantially free of particulate contaminants and its composition may be determined so as to optimise its benefits to the people and/or the manufacturing processes within the clean room.

The present invention is also beneficial as a result of the low temperature at which a breathable gas must be maintained if it is to be in the liquid state: heat is required to vaporise the liquefied gas, and this can be used to cool the clean room. Moreover, the filtered gas can be introduced into the clean room at such a temperature as to provide a cooling effect, to counteract the heat generated by people, machines and/or processes within the clean room and thus aiding, or even eliminating the need for, a clean room air conditioning/cooling system.

BRIEF DESCRIPTION OF THE DRAWINGS

The invention will now be described by way of example and with reference to the schematic drawing of a clean room.

DETAILED DESCRIPTION

The sole FIGURE illustrates a clean room provided with an apparatus for providing a clean respirable atmosphere thereto. A source 3 of liquefied respirable gas, such as that provided by the Applicants under the Trade Mark SLA, supplies liquid gas through a pipeline 5 and a filter 7, adapted to remove impurities which are particulate (or at least particulate at the cryogenic temperature of the liquid gas), to a heat exchanger 9 located within the clean room 1. There, a heat exchange process takes place (which can be useful for cooling the clean room) allowing the filtered liquid gas to vaporise and expand in volume, typically by about 600 times. The vaporised gas then leaves the heat exchanger 9 and flows first through a further filter 11 for removing any remaining particulate impurities and thence to an outlet 13 within the clean room 1.

Within the clean room 1 is a pressure sensor 15 adapted to measure the difference in atmospheric pressure inside and outside the clean room. The pressure sensor 15 sends an electronic signal to a controller 17 indicative of the sensed pressure difference, the controller 17 being adapted to actuate a valve 19 in pipeline 5, to vary the amount of gas flowing therealong so as to maintain a substantially constant overpressure (typically about 1 psi, or 7 kPa) in the clean room. This ensures that no impurities enter the clean room, against the tendency of the atmosphere to flow therefrom.

Many straightforward modifications to the apparatus shown in the drawing will immediately bound to the forefront of a skilled person's mind. For example, there could be any number of outlets for the vaporised gas and these could be located so as to "blanket" a particular item of equipment or workstation within the clean room with an ultra-clean respirable atmosphere, thus avoiding risk to operators. The clean room could be provided with outlets to atmosphere in locations such that there is a controlled and predetermined flow of air within the clean room and the controller 17 can be provided with further sensors (not shown) and programmed to vary the flow of gas to take account of variations in particle production—due to changing numbers of operators within the clean room 1, for example.

I claim:

1. A method of providing a clean respirable atmosphere in 1 clean room comprising:

supplying a liquefied breathable gas from a source thereof, the liquefied breathable gas, when fully vaporised, comprising between 15 and 20 mol % oxygen, the remainder being substantially nitrogen;

filtering the liquefied breathable gas to produce filtered liquid;

fully vaporising the filtered liquid to produce a gas;

filtering the gas to produce filtered gas; and introducing the filtered gas into the clean room.

2. The method as claimed in claim 1 comprising introducing filtered gas into the clean room at a rate sufficient to maintain an overpressure therein.

3. A method as claimed in claim 1 or claim 2 wherein the atmosphere within the clean room is vented to the ambient atmosphere outside the clean room.

4. The method as claimed in claim 3 comprising venting the clean room atmosphere via vents located adjacent sources or potential sources of airborne pollutants within the clean room.

5. The method as claimed in claim 1 further comprising heating the gas prior to its introduction into the clean room.

6. The method as claimed in claim 1 comprising controlling the supply of liquefied gas so as to vary the amount of gas introduced into the clean room.

* * * * *